United States Patent [19]

Arterburn

[11] 4,361,455
[45] Nov. 30, 1982

[54] METHOD OF FORMING HOSE WITH IMPROVED RESISTANCE TO DEFORMATION

[75] Inventor: Robert B. Arterburn, Littleton, Colo.

[73] Assignee: The Gates Rubber Company, Denver, Colo.

[21] Appl. No.: 303,454

[22] Filed: Sep. 18, 1981

Related U.S. Application Data

[62] Division of Ser. No. 126,253, Mar. 3, 1980, Pat. No. 4,306,591.

[51] Int. Cl.³ .......................................... B65H 81/00
[52] U.S. Cl. .................................. 156/149; 156/172; 156/244.13
[58] Field of Search ................... 156/149, 172, 244.12, 156/244.13; 138/124, 125, 126

[56] References Cited

U.S. PATENT DOCUMENTS

| | | | |
|---|---|---|---|
| 2,388,733 | 8/1945 | Parker | 138/126 |
| 2,478,939 | 8/1949 | Pape | 156/149 |
| 2,512,433 | 6/1950 | Leben | 156/149 |
| 3,018,800 | 1/1962 | Hanssens | 138/125 |
| 3,754,848 | 7/1956 | Knowland et al. | 156/149 |
| 3,988,189 | 10/1976 | Sullivan | 156/149 |
| 4,289,555 | 9/1981 | Haren et al. | 156/149 |
| 4,311,547 | 1/1982 | Biggs et al. | 156/149 |

OTHER PUBLICATIONS

Seon ® Vinyl Chloride Latexes Brochure by B. F. Goodrich, Chemical Co., No. 6912-CL.

Primary Examiner—Michael W. Ball
Attorney, Agent, or Firm—Curtis H. Castleman, Jr.; H. W. Oberg, Jr.; Raymond Fink

[57] ABSTRACT

A hose resistant to deformation is described which includes the usual polymeric tube and outer cover, and at least one annular reinforcement layer of fiber bundles sandwiched between the tube and cover. A polymeric aqueous-insoluble continuous film impregnates the fiber bundles and binds the reinforcement to at least one of the cover and tube, the continuous polymeric film serving to unexpectedly stiffen the hose appreciably. A method for producing the hose is described wherein the adhesive film is formed by applying a latex dispersion to the hose tube and/or reinforcement.

10 Claims, 3 Drawing Figures

METHOD OF FORMING HOSE WITH IMPROVED RESISTANCE TO DEFORMATION

This is a division of application Ser. No. 126,253, filed Mar. 3, 1980, now U.S. Pat. No. 4,306,591.

BACKGROUND OF THE INVENTION

This invention relates to hose produced by the superposition of polymeric layers and reinforcement, adhered together as an integral laminate.

There are a number of applications in which a hose must have sufficient body to resist crushing, kinking or stretching. For example, mine water hose and sewer cleaner hose must meet these criteria. In the past this has been accomplished by selecting the tube and/or cover stock to have sufficient modulus to provide the stiffness needed for the particular application. Certain thermoplastic stocks have been used in this respect, such as the relatively expensive Hytrel (trademark).

It is a primary object of this invention to produce hose highly resistant to deformation, using relatively inexpensive stocks which are formed of fairly soft or flexible materials which heretofore have not qualified for such use.

Representative of the prior art are U.S. Pat. Nos. 2,478,939 (Pape) and 3,988,189 (Sullivan).

SUMMARY OF THE INVENTION

Briefly described, the deformation-resistant hose of the invention comprises a polymeric tube, a polymeric outer cover, at least one annular reinforcement layer of fiber bundles sandwiched between the tube and cover, and a continuous adhesive aqueous-insoluble polymeric film impregnating the fiber bundles and binding a reinforcement layer to at least one of said cover and tube. The continuous polymeric film imparts stiffness to the hose compared to the same hose construction without the polymeric film ("control") to the extent that a force increased by at least 40 percent compared to the control is required to deform the hose to one-half its original inside dimension according generally to ASTM D 622 deformation test.

In another aspect, the invention pertains to a method for producing hose resistant to deformation including the steps of (a) applying a film forming adhesive latex dispersion to a polymeric tube; (b) twining at least one reinforcement layer comprised of fiber bundles over the polymeric tube whereby the latex dispersion impregnates interstices in the fiber bundles; and (c) applying a polymeric cover over the reinforcement layer. The temperature at which the latex dispersion is applied, or subsequently elevated to, exceeds the glass transition temperature of the latex dispersion, to thereby form a continuous polymeric film which binds the reinforcement to at least one of the tube or cover, and which binds fibers of the bundles together into an agglutinous stiffened mass.

BRIEF DESCRIPTION OF THE DRAWINGS

The invention in its preferred embodiments will be more particularly described in conjunction with the accompanying drawings, in which like numerals designated like parts, and in which.

PREFERRED EMBODIMENTS OF THE INVENTION

Figure 1:
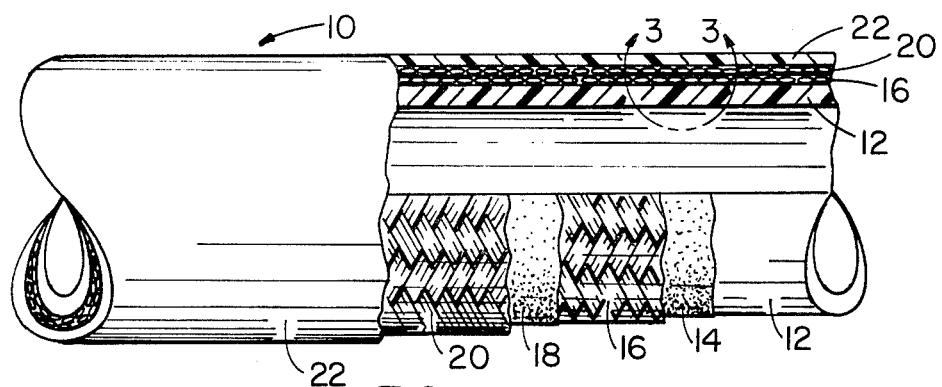
FIG. 1 illustrates a hose of the invention, partially in section and partially telescoped to show its component layers.

Referring first to FIG. 1, there is shown generally at 10 a cylindrically shaped hose in accordance with the invention, having a cylindrical core tube 12, an adhesive/stiffener layer 14, a first reinforcement layer 16 telescoped thereover, optional second layers of adhesive/stiffener 18 and telescoped reinforcement 20, and an outer sheath or cover 22. As will be described in more detail hereinafter, particularly with respect to FIG. 3, at least one of the reinforcement layers is formed of fiber bundles impregnated with the adhesive/stiffener in the form of an agglomerated polymeric film surrounding and interconnecting fibers together, to form a agglutinous mass.

The tube 12 and cover 22 may be formed of the same or different polymeric material, chosen for the particular application from a wide variety of thermoplastic or rubber polymeric materials, such as natural and synthetic rubbers, polyvinylchloride, polyurethane, polyamide, polyester, and the like. The sandwiched reinforcement layers 16 and 20 are formed of fiber bundles such as yarns or other textile composed of filaments of polyester, rayon, aramid, polyamide or other reinforcement material. The reinforcement may be in the form of braid, knit, spiral, wrap or the like.

Figure 2:
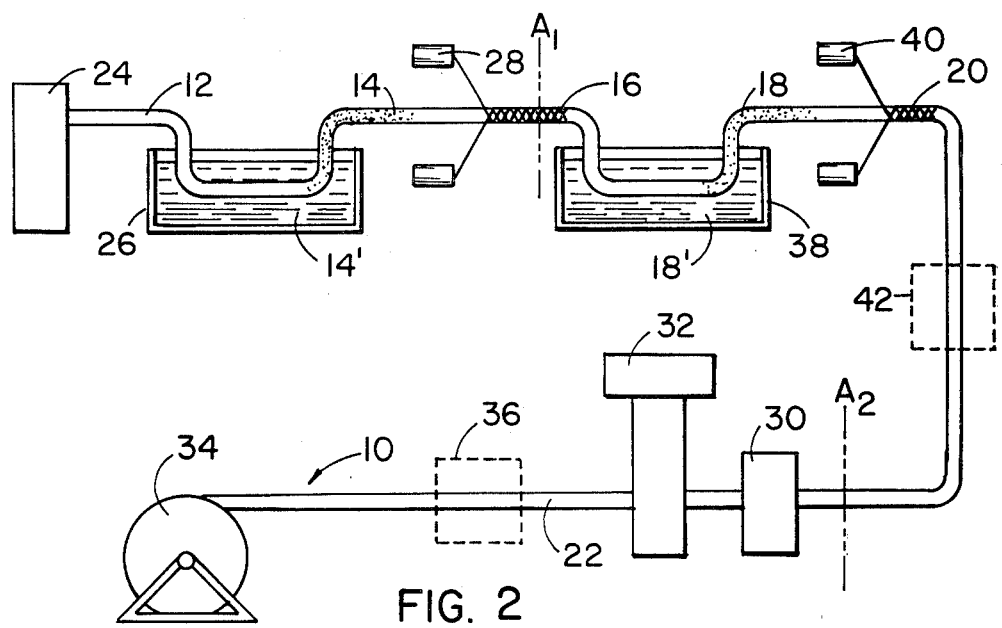
FIG. 2 is a flow diagram showing schematically a method for producing the hose of the invention.

The method of construction of the hose of FIG. 1 is illustrated in FIG. 2. Core tube 12 may be extruded from a standard extruder 24. A thin adhesive layer 14 is then applied as a latex dispersion to the exterior of tube 12 by dipping in tank 26 containing adhesive 14', although alternative coating operations such as brushing, spraying or wiping through an appropriate die would also be useful. The tube with annular adhesive coating 14 is then passed through reinforcing machine 28 which twines reinforcement 16 about the surface of the coated tube, in the form of braid, spiral, or the like. If the hose is to consist of only the single layer of reinforcement, the reinforced tube with adhesive layer 14 may then enter a preheater 30, especially for the application of a thermoplastic cover thereover to enhance the bonding, and then to a customary crosshead extruder 32 which applies the outer sheath 22 in known manner. The hose if thermoplastic may then be taken up directly on reel 34, or alternatively if vulcanizable materials are used for the tube and/or cover, the hose may be cured first in vulcanization zone 36 using customary heating methods, including lead press, open steam cure, microwave and fluidized bed.

Where multiple layers of reinforcement are to be twined onto the tube, the additional steps shown between $A_1$ and $A_2$ may be employed, with as many replications as required. To produce the hose of FIG. 1, the tube and first layer of reinforcement are dipped into a second adhesive bath 38 containing adhesive 18' in the form of a latex dispersion whereby a second thin layer 18 of adhesive material in accordance with the invention is applied over reinforcement layer 16. The second reinforcement layer 20 is twined over the reinforced tube with the aid of a second reinforcing machine 40. The double reinforced core tube may now be preheated at 30, passed through extruder 32 to receive outer cover 22, and be taken up on reel 34. If additional bonding is required between the outer reinforcement layer 20 and cover 22, the hose may pass through a further adhesive dip applicator 42. The hose may also be subjected to other operations depending upon the nature of the polymeric constituents of the hose, such as a cooling tank, dryer or the like.

The invention is premised upon the use of adhesive layers 14, 18 which are aqueous-insoluble and which form under the conditions of manufacturing a continuous adhesive polymeric film which impregnates the fiber bundles forming the reinforcement, and interstices between and within the fiber bundles, and which binds the reinforcement layer(s) to either or both of the cover and tube. The properties of the resultant continuous polymeric film critically serve to stiffen the hose compared to the same hose without the polymeric film ("control") to the extent that a force increase by at least 40 percent compared to the control is required to deform the hose to one-half its original inside dimension (i.e., tube inside diameter) using American Society For Testing And Materials (ASTM) D 622, Deformation Test. More preferably a force increased by at least about 65 percent and most preferably by at least about 110 percent compared to the control is required to deform the hose to one-half its original inside dimension per ASTM D 622 Deformation Test.

The adhesive/stiffener material of the invention must be an aqueous-insoluble, film forming polymeric material preferably applied as a latex dispersion. Generally, the dispersion is in the form of an emulsion, stabilized against coagulation, with a solids content usually in the range from about 35 percent to about 65 percent, more preferably from about 50 percent to about 60 percent. A continuous polymeric film which serves the critical dual purpose of an adhesive as well as a stiffener is assured by applying the latex dispersion at a temperature which exceeds the glass transition temperature of the polymer of the latex, or by subsequently elevating the temperature above the glass transition temperature to cause continuous film formation. While the film produced has a dramatic stiffening effect, it will still possess a substantial degree of flexibility to permit the hose to be flexed while assuring coalescence of the polymer, and this can be provided in known manner by increasing the drying temperature, by polymerizing during manufacture of the latex with a suitable softening comonomer or by adding plasticizer, or a combination of these.

To achieve the balance of stiffness and flexibility required, it is preferred that the adhesive polymer or copolymer have a modulus at 100 percent elongation of at least about 200 psi, more preferably at least about 500 psi and most preferably at least about 750 psi. For a given polymer, its modulus can be increased generally by raising the fusion temperature and fusion time, as is known. Adhesive polymers which may be applied in latex form, and which are particularly preferred in accordance with the invention include acrylic, vinyl chloride, vinyl chlorideacrylic copolymers, vinylidene chloride, nitrile and styrenebutadiene latexes. A line of such adhesive latexes are offered by the B. F. Goodrich Company under the trademarks Good-rite, Geon and Hycar. Most preferred are latexes based on copolymers of vinyl chloride as the resin, preferably plasticized, and having glass transition temperatures $T_g$ of generally less than about 110° F., more preferably less than about 72° F. (room temperature).

EXAMPLE

As a specific example of a hose of the form of FIG. 1 constructed in accordance with the invention, a core tube 12 of one inch nominal internal diameter of polyvinyl chloride was processed by passing it at room temperature through a wiping die containing a bath of Geon 576 (trademark), a plasticized vinyl chloride copolymer having a glass transition temperature $T_g$ of 68° F. and a modulus of 900 psi at room temperature. The flow rate was adjusted to achieve an adhesive coating of approximately 0.01 to about 0.02 inches thick. The tube with coating 14 was then introduced into a first braider deck 28 in which polyester of tight pack, 2 ends per braid, and 5500 denier was braided on the coated tube. The thus reinforced tube was then passed through a second wiping die applying an additional coating 18 of Geon 576 PVC latex, and then the hose was introduced into a second braiding station 40 at which a second braid 20 of identical construction to the first braid 16 was twined onto the hose preform. The thus reinforced and coated tube was introduced into preheater 30 held at a temperature of 750° F., wherein the outer polyester braid 20 was softened. The hose preform then was introduced into crosshead extruder 32 which applied a cover layer of polyurethane (Estane 58360), and the completed hose wound up on reel 34. This hose shall be designated Sample A.

The same procedure and materials were used to produce three additional samples, except the adhesive treatment was varied as follows. In Sample B Geon 450×20 (trademark), a vinyl chloride-acrylic copolymer having a glass transition temperature of 50° F., and a modulus of 220 psi at room temperature was used. Sample C employed Geon 351 (trademark), a nonplasticized vinyl chloride copolymer having a glass transition temperature of 142° F., and Sample D was a control in which no adhesive was applied. The adhesive of Sample C, as evidenced by photomicrograph, formed a cracked, discontinuous film since the temperature of application was not above the glass transition temperature of the resin. Each of the samples were tested for adhesion. While all the samples demonstrated good adhesion between the cover 22 and outer reinforcement braid 20, the control evidenced no measurable adhesion between the tube and first reinforcement layer 16, and between reinforcement layers 16 and 20. Sample C evidenced no measurable adhesion between the respective reinforcement layers 16 and 20, apparently because no continuous film was formed, although good adhesion between the tube and first reinforcement layer was measured. Samples A and B evidenced adhesions of at least one pound per square inch both between the tube and reinforcement, and between the respective reinforcement layers.

In a second test, each of the samples were deformed to 50 percent of its original inside dimension (i.e., ½ inch), in accordance with the apparatus and procedure of ASTM D 622 Deformation Test. For improved comparative purposes, a ½ inch feeler gauge was employed rather than the ¼ inch feeler gauge called for in the test specification. The test results showed that a force of 52 pounds was required to deform Sample A to ½ of its original inside dimension, Sample B required 35 pounds, Sample C required 40 pounds, and the control required only 24 pounds.

A collapse test in which each of the samples were bent around four different mandrels (6 inch radius, 4 inch radius, 3 inch radius, and 2 inch radius respectively) showed Sample A to be most resistant to collapse about the respective mandrels, Sample B next best, with the control (Sample D) and Sample C being approximately the same, both inferior to Samples A and B.

Figure 3:
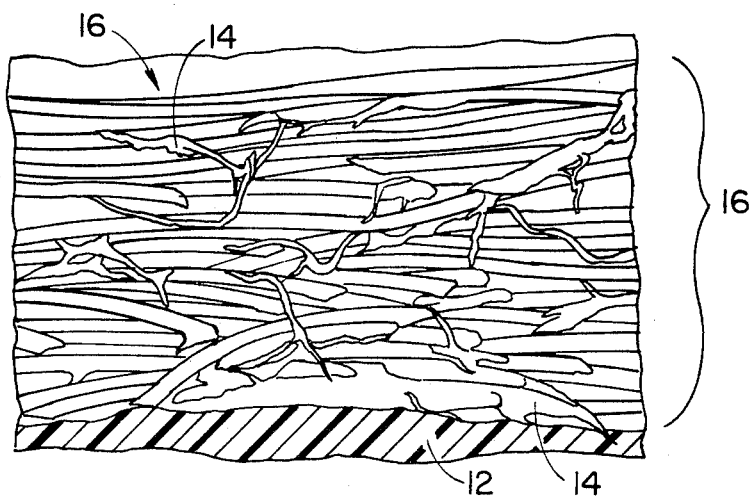
FIG. 3 depicts an enlarged sectional view along lines 3—3 of FIG. 1, showing portions of the hose wall under magnification of approximately 200 ×.

In FIG. 3, a drawing taken from a photomicrograph (100× SEM) shows the outer surface of tube 12, first braid layer 16, and the impregnated Geon 576 adhesive/stiffener, taken from the hose of Sample A referred to in the above tests. As seen in FIG. 3, the adhesive impregnates interstices within the fiber bundle shown generally at 16, and forms with the fiber bundle an agglomerated, agglutinous mass of adhesive strings or particles 14 interconnecting individual fibers of the bundle as a crack-free film, and also forming at least a partial coating on the fiber surfaces.

Thus, with the hose of the subject invention it is possible to use tube stock (e.g., PVC) and cover materials which have desired properties, such as low temperature flexibility, and which are relatively inexpensive, while still achieving a resultant hose highly resistant to deformation. The stiffness is achieved without having to use the expensive, high modulus stocks of the prior art, such as Hytrel (a polyester compound).

While certain representative embodiments and details have been shown for the purpose of illustrating the invention, it will be apparent to those skilled in this art that various changes and modifications may be made therein without departing from the spirit or scope of the invention.

What is claimed is:

1. A method for producing hose resistant to deformation comprising the steps of:
   applying a film forming adhesive latex dispersion to a polymeric tube;
   twining at least one reinforcement layer comprised of fiber bundles over the polymeric tube whereby the latex dispersion impregnates interstices in the fiber bundles; and
   applying a polymeric cover over the reinforcement layer;
   the temperature at which the latex dispersion is applied, or elevated to, exceeding its glass transition temperature, to thereby form a continuous polymeric film to bind the reinforcement to at least one of the tube or cover, and to bind fibers of the bundles together into an agglutinous stiffened mass;
   said continuous polymeric film serving to substantially stiffen the hose in comparison to the same hose without said polymeric film.

2. The method of claim 1 wherein the adhesive latex dispersion has a glass transition temperature of less than about 110° F.

3. The method of claim 1 wherein the adhesive latex dispersion is based on a plasticized copolymer of vinyl chloride.

4. The method of claim 3 wherein the continuous polymeric film has a modulus at 100 percent elongation of at least about 750 psi.

5. The method of claim 1 wherein the adhesive latex dispersion has a glass transition temperature of less than about 72° F.

6. The method of claim 1 wherein the continuous polymeric film has a modulus at 100 percent elongation of at least about 200 psi.

7. The method of claim 1 wherein the continuous polymeric film has a modulus at 100 percent elongation of at least about 500 psi.

8. The method of claim 1 wherein the continuous polymeric film serves to stiffen the hose in comparison to the same hose construction produced by a method which eliminates application of the film forming adhesive latex ("control") to the extent that a force increased by at least about 40 percent compared to the control is required to deform the hose produced by the method of claim 9 to one-half its original inside dimension using ASTM D 622 deformation test.

9. A method for producing hose resistant to deformation comprising the steps of:
   forming an elongated polymeric tube;
   twinning at least one reinforcement layer comprised of fiber bundles having interstices therein over the polymeric tube;
   impregnating the interstices of the fiber bundles with a film forming adhesive latex dispersion; and
   applying a polymeric cover over the reinforcement layer;
   said film forming adhesive latex dispersion also making contact with at least one of said tube and cover;
   the temperature at which the latex dispersion is applied, or elevated to, exceeding its glass transition temperature, to thereby form a continuous polymeric film having itself a modulus at 100 percent elongation of at least about 200 psi to bind the reinforcement to at least one of the tube or cover, and to bind the fibers of the bundles together into an agglutinous stiffened mass;
   said continuous polymeric film serving to substantially stiffen the hose in comparison to the same hose without said polymeric film.

10. The method of claim 9 wherein the adhesive latex dispersion has a glass transition temperature of less than about 72° F.

* * * * *